Patented Sept. 14, 1937

2,092,797

UNITED STATES PATENT OFFICE 2,092,797

PURIFICATION OF ORGANIC COMPOUNDS

James I. Carr, Wilmington, Del., assignor to E. I. du Pont de Nemours & Company, Wilmington, Del., a corporation of Delaware No Drawing. Application January 3, 1935, Serial No. 237

13 Claims. (Cl. 260—124)

This invention relates to a process for freeing an organic solid from adherent liquid impurities. More particularly it refers to the purification of solid organic compounds by removing therefrom organic solvents and by-products with which said solid compounds are contaminated during the process of formation.

Heretofore organic liquids have been removed from the surface of organic solids by means of tedious filtrations and recrystallizations. Such procedure was not only time-consuming and expensive, but reduced by an appreciable extent the yield.

It is an object of the present invention to purify organic solids in a more efficient manner than was formerly possible. A further object is to devise a process wherein the tedious multiple filtrations and crystallizations of the prior art might be avoided. A still further object is to remove adherent solvents and liquid by-products from organic solids by means of a rapid and highly flexible operation. A still further object is to produce acyl-acet-arylamides of a high degree of purity in a cheap and convenient manner. Additional objects will become apparent from a consideration of the following description and claims.

These objects are attained according to the herein described invention wherein an organic solid is freed from adherent liquid impurities by treating it with a liquid containing a sulfonated hydrocarbon having at least 8 carbon atoms in the molecule. In a more restricted sense the invention pertains to the removal of organic solvents and liquid by-products from an organic solid by treating it with an aqueous solution of a sulfonated hydrocarbon containing from 8 to 18 carbon atoms in the molecule. In its preferred embodiment the invention is directed to the purification of acyl-acet-arylamides by subjecting the solid arylamides to treatment with a water-soluble salt of a sulfuric acid ester of a higher alcohol containing more than 8 carbon atoms, and in particular containing from 12 to 18 carbon atoms.

The invention may be more readily understood by a consideration of the following illustrative examples, in which the quantities are stated in parts by weight:

Example 1

300 parts of aceto-acetic ester, previously dried, were mixed with 325 parts of solvent naphtha and heated to 140° C. in a suitable agitated vessel equipped with a condenser system for the removal of the alcohol. 186 parts of aniline was added uniformly during one-half hour, maintaining the temperature at 140°±2° C. The heating was continued until the maximum yield was obtained and then cooled rapidly to 85° C. when it was transferred to a brine jacketed vessel and the cooling continued to 0-5 C. Then 100 parts of water, 100 parts of ice and 70 parts of 31% hydrochloric acid were added, and the stirring continued for 2 hours.

The mixture was then filtered. The wet filter cake was agitated with about 400 parts of 14% salt solution at 0-15° C. and 1 part of a sodium alkyl sulfonic acid was added. The alkyl group in this compound should preferably contain from 12-16 carbon atoms. The addition of this alkyl sulfonic acid assists in the removal of the solvent and impurities adhering to the crystals and when they are again filtered and washed with brine or water, they are almost completely free from organic impurities.

Example 2

Use instead of 1 part of alkyl sulfonic acid specified in Example 1, 1 part of the sodium salt of the sulfation product obtained by sulfating saturated alcohols containing preferably from 12-16 carbon atoms. Otherwise proceed exactly as in Example 1.

Example 3

Use instead of 1 part of alkyl sulfonic acid salt specified in Example 1, 1 part of the oleic acid ester of beta-hydroxy-ethane-1-sulfonic acid. Otherwise proceed as in Example 1.

Example 4

Use instead of 1 part of alkyl sulfonic acid salt specified in Example 1, 1 part of beta-oleyl-aminoethane-alpha-sulfonic acid. Otherwise proceed as in Example 1.

Example 5

Charge previously dried aceto-acetic ester (300 parts) and 350 parts of xylene into a suitable reaction vessel. Heat to 145° C. and run in at this temperature 275 parts of para-phenetidine during 30-35 minutes. Continue the heating until the reaction reaches the maximum of completeness, then cool to 90° C. Run the mixture into a brine-jacketed crystallizer and continue the cooling with agitation to 0-5° C. Add 100 parts of water, 100 parts of ice and 75 parts of 31% hydrochloric acid. Continue the agitation for 2 hours and then filter. Transfer the crude filter cake to an agitated vessel and stir with cold water or a brine solution. Add 1 part of the sulfation product obtained by sulfating saturated alcohols containing preferably from 12-16 carbon atoms. Continue the agitation about 5-10 minutes and filter. Wash the cake with brine or water. The washed cake is substantially free from liquid organic impurities.

Example 6

Heat 156 parts of aceto-acetic ester and 100 parts of ortho-dichlorbenzene to 145° C. in a suitable vessel equipped with an agitator and condenser. Add a mixture of 138 parts of paranitraniline and 300 parts of ortho-dichlorbenzene at 145°±10° C. Continue the heating until the maximum yield has been obtained, then cool the mixture to 15° C. Transfer to suitable agitated vessel and add 150 parts of ice. Add, during 15-30 minutes, 55 parts of 31% hydrochloric acid. Continue the agitation for 1½ hours and filter. Agitate the filter cake with enough water to make a thin slurry and add 1 part of beta-oleyl-aminoethane-alpha-sulfonic acid. Continue the agitation for a few minutes and filter. Wash with a little water. The resulting filter cake is practically free from ortho-dichlorbenzene and such impurities as may have been dissolved in it.

Example 7

Mix 150 parts of xylene and 150 parts of dried aceto-acetic ester and heat in a suitable agitated vessel to 142-145° C. Add at this temperature during about one-half hour, 128 parts of ortho-chloraniline and continue the heating for about 15 minutes or until the maximum amount of the desired aceto-acet-o-chloranilide has been formed. Cool the reaction mixture to 0-5° C. and filter. Add the filter cake to enough cold 15% brine solution to make a thin slurry. Add 100 parts of ice and 3 parts of 31% hydrochloric acid. Add 1 part of the sulfonation product obtained by sulfonating saturated alcohols containing 12-16 carbon atoms. Agitate for 1 hour and filter. Wash with a little brine or water. The resulting product is practically free from organic impurities.

It is to be understood that the aforementioned examples are illustrative merely of a few of the many methods of carrying out the practical application of the present invention. The individual reactants, the proportions thereof, and the conditions of reacting may be varied widely without departing from the scope of this invention.

For example, in place of the solid organic compounds referred to in such examples other organic compounds which are contaminated with liquids may be substituted. These liquids are usually of an organic nature, and are introduced into or result from the reaction by means of which the solid organic compound was produced. However, it is contemplated that such impurities may result from other causes and may be quite dissimilar from those previously described. In its preferred embodiment the invention is directed to, but not restricted to, the purification of acyl-acet-arylamides, and in particular to aceto-acet-arylamides.

The organic compounds contemplated herein may be produced by numerous well known reactions. In the case of the arylamides, they may be conveniently produced by heating the desired arylamine with an acyl-acetic ester in the presence of a diluent or solvent. The product is crystallized from the reaction mixture and acidified with a fairly strong solution of mineral acid. Such acidification breaks up some of the reaction by-products and impurities in which the arylamides are quite soluble, thereby permitting a larger recovery of the desired product. Moreover, unreacted arylamides are converted to their water-soluble salts by such acidification treatment, thereby facilitating their removal in the following filtration step.

In place of aceto-acet-esters previously referred to in the examples other acyl-acet-esters may be substituted. Likewise, in place of the arylamines other arylamines may be used. Such arylamines may have substituted thereon numerous well known substituents such as halogen, alkyl, alkoxy, nitro, trifluoromethyl, benzoylamino, etc. groups. After formation of the solid arylamides and acidification the majority of the liquid may be removed by filtration. The resulting arylamides contain an appreciable amount of organic liquid on the surface thereof. This liquid is practically completely separated therefrom by treatment with the sulfonated hydrocarbons to be more fully described hereafter. Such treatment is advisably carried out in the presence of an aqueous brine solution. It is to be understood that while the brine solution is helpful it is not essential, and the treatment may be carried out without the use of any brine whatsoever. Also, in place of a solution of brine the treatment with sulfonated hydrocarbons may be carried out in the presence of other salts or in the complete absence of such secondary assistants.

Sulfonated hydrocarbons contemplated herein may be of the aliphatic, cycloaliphatic, aralkyl, etc. series. Such hydrocarbons should contain at least 8 carbon atoms and preferably from 12-18 carbon atoms. In general, most satisfactory results are obtained by utilizing normal primary alcohols obtained, for example, by the catalytic or sodium reduction of vegetable and animal fats, oils and waxes. These alcohols may be saturated, unsaturated, monohydric and/or polyhydric. As an example of a few alcohols coming within this category mention may be made of octyl, decyl, lauryl, myristyl, cetyl, stearyl, oleyl, ricinoleyl, linoleyl, batyl, chimyl and selachyl alcohols. In place of individual alcohols mixtures thereof may be used. A mixture predominating in lauryl, but containing small portions of decyl, myristyl and cetyl alcohols has been found to be particularly efficacious.

Sulfonation of the aforementioned alcohols and related hydrocarbon derivatives may advisably be carried out by treatment with well known sulfonating agents, such as concentrated sulfuric acid, oleum, chlorsulfonic acid, pyridine sulfur trioxide, etc. In this connection it may be mentioned that where "sulfonation" is referred to herein this word is used in its generic sense to mean either the production of a sulfuric acid ester or the production of a true sulfonic acid derivative.

After sulfonation the resulting products are advisably neutralized with salt-forming compounds of organic or inorganic origin. Compounds of inorganic origin are, for instance, soda ash, caustic soda, ammonium hydroxide, caustic potash, oxides and hydroxides of magnesium, lithium, etc. Salt-forming compounds of organic origin are in particular the various amines and related bases, such as cyclohexylamine, monoalkyl- and dialkyl-cyclohexylamines, quaternary ammonium bases generally, quaternary phosphonium bases generally, tertiary sulfonium bases, pyridine, piperidine, mono-, di and tri-alkylamines, mono-, di- and tri-alkylolamines, hydroxy-alicyclic-amines, etc.

As previously mentioned, in place of or in addition to normal primary alcohols, other related compounds may be used, for instance, hydrocyclic, napthenic and aralkyl alcohols. Likewise, non-alcoholic hydrocarbons may be used, for example the oleic acid ester of beta-hydroxyethane-1-sulfonic acid, beta-oleyl-aminoethane-alpha-sulfonic acid.

The aforementioned sulfonated hydrocarbons may be used alone, in admixture with one another, and/or in admixture with prior art wetting agents and assistants therefor. The amount of such compounds which is required may vary considerably, although in general an amount ranging from 0.02% to about 3% is sufficient. It is to be understood that the aforementioned range is not stated for purposes of limitation but rather for purposes of illustration. The temperature at which the solid organic compounds are treated with solutions of sulfonated hydrocarbons may be varied widely. However, it is usually advisable to keep such temperature as low as possible in order to prevent unnecessary filtrate loss and undue decomposition of the product.

This invention is of particular value in removing hydrocarbon solvents such as xylene, naphtha, chlorobenzene, orthodichlorobenzene, etc. While such solvents were removed from arylamides it is contemplated that they may also be removed from other organic solids.

Attention is directed to the fact that the sulfonated hydrocarbons are derived from numerous sources. While normal primary alcohols have been referred to as preferred it is understood that in place thereof or in admixture therewith sulfonated derivatives of higher fatty acids, sulfonated derivatives of ethers of polyhydric alcohols, etc. may be utilized. Sulfuric acid esters are ordinarily superior to true sulfonic acid derivatives. Nevertheless, the latter compounds are quite effective for purposes of the present invention and are contemplated for use herein either alone or in admixture with the sulfuric esters and/or prior art wetting agents.

By means of the present invention a speedy and efficient separation of organic liquids from organic solids is made possible. This separation is particularly effective in an acid medium. The yield of solid organic compounds is not reduced so the process is a pronounced improvement over existing processes. The compounds capable of treatment and the impurities with which they are contaminated are exceedingly varied. Likewise, the agents for effecting this purification are quite numerous and are readily available.

As many apparently widely different embodiments of this invention may be made without departing from the spirit and scope thereof, it is to be understood that the invention is not limited to the specific embodiments thereof except as defined in the appended claims.

I claim:

1. A process for freeing a crystalline organic solid which is sparingly soluble in cold water from adherent acidified organic liquids which comprises treating said solid with an aqueous solution of a water-soluble salt of a sulfonated alcohol containing from 8 to 18 carbon atoms in the molecule, and separating the purified crystalline solid therefrom.

2. A process for freeing a crystalline organic solid which is sparingly soluble in cold water from adherent acidified organic liquids which comprises treating said solid with an aqueous solution of a water-soluble salt of a sulfonated normal primary alcohol containing from 8 to 18 carbon atoms in the molecule, and separating the purified crystalline solid therefrom.

3. A process for freeing a crystalline organic solid which is sparingly soluble in cold water from adherent acidified organic liquids which comprises treating said solid with an aqueous solution of a water-soluble salt of a sulfuric acid ester of a normal primary alcohol containing from 8 to 18 carbon atoms in the molecule, and separating the purified crystalline solid therefrom.

4. A process for freeing a solid acyl-acet-arylide from adherent acidified organic liquids which comprises treating said arylide with an aqueous solution of a sulfonated hydrocarbon containing from 8 to 18 carbon atoms in the molecule, and separating the purified crystalline solid therefrom.

5. A process for freeing a solid acyl-acet-arylide from adherent acidified organic liquids which comprises agitating said arylide with an aqueous solution of a water-soluble salt of a sulfonated normal primary alcohol containing from 8 to 18 carbon atoms in the molecule, and filtering the purified arylide from the resulting solution.

6. A process for freeing a solid aceto-acet-arylide from adherent acidified organic liquids which comprises agitating said arylide with an aqueous solution of a water-soluble salt of a sulfuric acid ester of a normal primary alcohol containing from 12 to 18 carbon atoms in the molecule, and filtering the purified arylide from the resulting solution.

7. The process of claim 6 wherein a mixture of normal primary alcohols, predominating in lauryl alcohol, is utilized.

8. A process for freeing solid aceto-acet-anilide from an acidified hydrocarbon solvent which comprises agitating said anilide with a brine solution of the sodium salt of the sulfuric acid ester of technical lauryl alcohol.

9. A process for freeing a crystalline organic compound which is sparingly soluble in cold water from liquid organic impurities which comprises agitating said compounds with an aqueous solution of an alkyl sulfonic acid containing at least 8 carbon atoms in the molecule, and separating the purified crystalline compound therefrom.

10. A process for freeing a crystalline organic compound which is sparingly soluble in cold water from liquid organic impurities which comprises agitating said compounds with an aqueous solution of a water soluble salt of an alkyl sulfonic acid containing at least 8 carbon atoms in the molecule, and separating the purified crystalline compound therefrom.

11. A process for freeing a crystalline organic compound which is sparingly soluble in cold water from liquid hydrocarbon impurities which comprises agitating said compounds with an aqueous solution of a water soluble salt of an alkyl sulfonic acid containing at least 8 carbon atoms in the molecule, and separating the purified crystalline compound therefrom.

12. A process for freeing a crystalline acyl-acet-arylide from liquid hydrocarbon impurities which comprises agitating said compounds with an aqueous solution of a water soluble salt of an alkyl sulfonic acid containing at least 8 carbon atoms in the molecule, and separating the purified crystalline compound therefrom.

13. A process for freeing a solid aceto-acet-arylamide from adherent organic liquid impurities which comprises agitating said arylamide with an aqueous solution of an emulsifying agent selected from the group consisting of water-soluble salts of hydrocarbon sulfates and sulfonates containing eight or more carbon atoms, and separating the purified arylamide therefrom.

JAMES I. CARR.